No. 843,309. PATENTED FEB. 5, 1907.
W. STURMA.
BEATER, MIXER, AND MASHER FOR EGGS, CREAM, VEGETABLES, &c.
APPLICATION FILED JUNE 21, 1906.
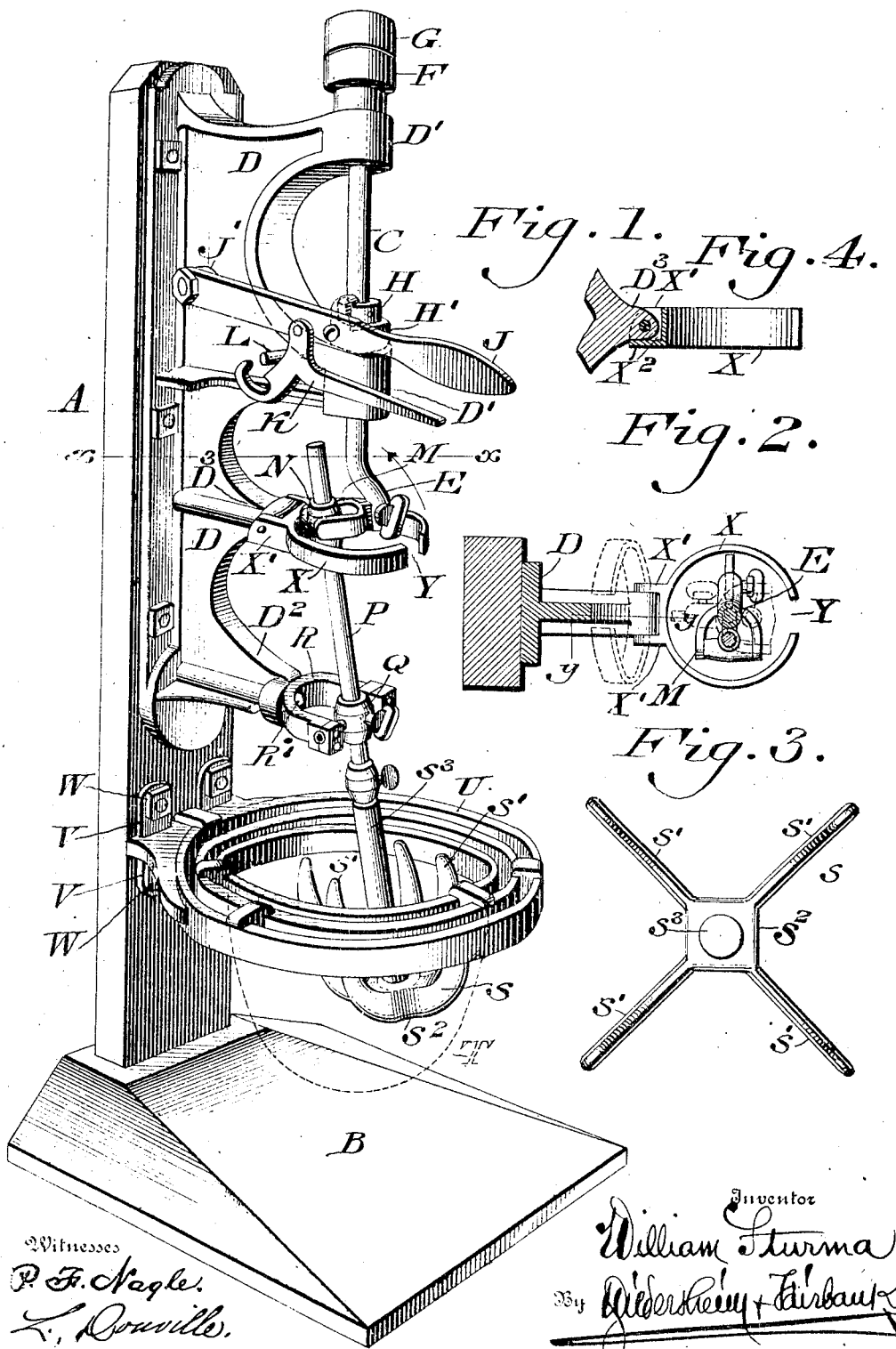

UNITED STATES PATENT OFFICE.

WILLIAM STURMA, OF PHILADELPHIA, PENNSYLVANIA.

BEATER, MIXER, AND MASHER FOR EGGS, CREAM, VEGETABLES, &c.

No. 843,309.   Specification of Letters Patent.   Patented Feb. 5, 1907.

Application filed June 21, 1906. Serial No. 322,774.

*To all whom it may concern:*

Be it known that I, WILLIAM STURMA, a citizen of the United States, residing in the city and county of Philadelphia, State of Pennsylvania, have invented a new and useful Beater, Mixer, and Masher for Eggs, Cream, Vegetables, &c., of which the following is a specification.

My invention relates to improvements in the class of beaters, mixers, and mashers for eggs, cream, vegetables, &c., as shown in the Letters Patent of the United States No. 768,086, granted to me on the 23d day of August, 1904, and consists of means for guarding the hands, &c., of the operator from contact with the couplings for the plurality of shafts employed to impart oscillatory motions to the head that works in the pan containing the material.

It further consists of means for placing the guard in inoperative position.

It further consists of a head of novel construction, as will be hereinafter set forth.

Figure 1 represents a perspective view of a beater, &c., embodying my invention. Fig. 2 represents a partial plan view and partial horizontal section on line $x\,x$, Fig. 1. Fig. 3 represents a top or plan view of a beater employed. Fig. 4 represents a section of a portion on line $y\,y$, Fig. 2.

Similar letters of reference indicate corresponding parts in the figures.

Referring to the drawings, A designates a standard, and B a support or base therefor.

C designates a driving-shaft, the same being vertically mounted in the bearings D' on the bracket D, which is bolted or otherwise secured in said standard A, said shaft having its front end deflected, as at E. On the upper end of said standard are the loose and fast pulleys F G, each of which is adapted to have a belt or band pass around the same. On the shaft C is the sleeve H, which is adapted to rotate with the same and rests upon the collar H', which forms a bearing for said shaft, and mounted upon it is the lever J, whose axis J' is on the bracket D. Depending from said lever and pivotally connected therewith is the latch K, which is adapted to engage with a pin or stud L, the latter projecting from the bracket D, whereby the lever J, and consequently the shaft C, may be held in elevated position, so that the belt or band shifts from the fixed pulley G to the loose pulley F, thus rendering the shaft C inoperative and stopping the operation of the device. When the latch is withdrawn from the pin or stud L, the lever J is permitted to drop, when the belt or band engages with the fast pulley G, thus communicating power to said shaft.

Connected with the lower end of the shaft C is a coupling M, which carries the sleeve N, the latter freely receiving the upper end of the shaft P, a portion of said shaft below said sleeve N also passing through a sleeve Q, which is journaled on the rocking-arm R, which is pivoted, as at R', on a bearing piece, D² at the lower portion of the bracket D.

Depending from the lower end of the shaft P is the head S, which is adapted for beating, mixing, or mashing, it entering the pan T, (shown in dotted lines,) which pan is sustained in either of the open rims U, the latter being connected by the ears V and bolts W with the standard A and being of different diameters for different sizes of pans, said rims being provided with means for sustaining one on the other.

It will be seen that when the shaft C is in operation and properly lowered motion is communicated from the shaft P, and as the latter is supported in the sleeve Q after the manner of a universal joint said shaft P oscillates and forces the head S to be carried around by the same, and so sweep the interior of the pan T, thus effectively acting on the contents thereof.

Mounted on the bracket D is the bearing-piece D³. At the portion of the bracket D adjacent to the coupling M is the ring X, the front end of which is divided or split, forming the throat Y, it being seen that said ring when in its operative position is placed somewhat around said coupling and forms a guard for the hand of the operator, so as to prevent the same from being caught or injured by the movements of said coupling, said ring encircling said coupling at a sufficient distance therefrom so that as the hand of the operator moves from the pan T to the lever J, or vice versa therefrom, and it or his hand contacts with said ring the latter warns the operator of the dangerous proximity of his hand or head to said coupling, while also removing the hand or head sufficiently therefrom.

When it is desired to have access to said coupling, the ring is thrown up from a horizontal to an upright position, when it may be rested against the bracket D, as shown in dotted lines, Fig. 2, it being noticed that owing to the throat Y the ring may readily pass over the lower portion of the shaft C and upper portion of the shaft P.

It will also be seen that the bracket D extends from the upper portion of the standard A to near the ring U, and so provides bearings for the shaft C, the ring X and the oscillating arm R providing a strong structure for supporting said parts.

The head S is composed of a number of blades S', extending from a centrally-connecting block or boss S², which latter is connected with a shank S³, by which the head is attached to the operating-shaft and projects upwardly from said block and curved in the direction of their length, while tapering from said block to the upward terminal of the same, the sides of said blades being also in the direction of their lengths. The blades S' have their lower ends radiate from the exterior of said boss S², it being noticed that the latter is of small size in transverse direction, and said blades present broad and flat sides to the article to be beaten, &c., throughout their extreme lengths from bottom to top, said blades alternating with the sides of the boss and standing out from the same, whereby the material will be subjected to the beating action not only from near the shank S³, but also the extreme width of the blades, and so it is dashed in and out in radial direction while being driven ahead.

It will be seen that when the head rotates it acts effectively on the material to be beaten, whipped, &c., violently beating the same and causing effective beating, mixing, or mashing of the material which is subjected to said action, and as the blades are integral with the block or hub S² they are strong in their connection therewith and being of solid material present broad closed surfaces to the material thus.

In order to hold the ring X in horizontal or operative position, the ears X', by which said ring is pivotally connected with the bearing D³ on the bracket D, are connected by the cross-bar X², which is adapted to abut against said bearing as a stop, (see Fig. 4,) thus limiting the descent of said ring and supporting the same, as shown in said Fig. 4, as well as in Fig. 1.

Having thus described my invention, what I claim as new, and desire to secure by Letters Patent, is—

1. In a beater of the character stated, a guard for the driving-shaft thereof adapted to encircle or approximately encircle said shaft having in its periphery a division, permitting the walls thereof to pass said shaft in being placed in inoperative position, without displacing the shaft.

2. In a beater of the character stated, a divided shaft, a bearing therefor, a coupling for the members of said shaft, a ring mounted on said bearing and adapted to encircle or approximately encircle said coupling, said ring having a throat in its periphery adapted to pass said shaft in its location in inoperative position.

3. In a beater of the character stated, a guard for the shaft thereof composed of a piece adapted to encircle or approximately encircle said shaft and pivotally mounted on a bearing so as to be removed into inoperative position, the pivotal portion of said piece having a member adapted to form a stop assisting to support the piece in operative position and the peripheral portion thereof having a division permitting the walls thereof to pass said shaft in being placed in inoperative position without displacing the shaft.

4. In a beater of the character stated, a pan-support composed of an open member, means for holding the same in operative position and a removable rim adapted to be placed within said support, the same being provided with means for sustaining it thereon.

5. A rotary beater composed of a central boss and blades, the latter radiating from said boss, extending upwardly therefrom and having flat sides, said blades alternating with the sides of said boss and forming a continuity of said sides from or approximately from the bottoms to the tops thereof.

WILLIAM STURMA.

Witnesses:
JOHN A. WIEDERSHEIM,
S. R. CARR.